United States Patent
Ozeki (10) Patent No.: US 6,622,687 B2
(45) Date of Patent: Sep. 23, 2003

(54) INTAKE APPARATUS OF MULTI-CYLINDER INTERNAL COMBUSTION ENGINE

(75) Inventor: Hisashi Ozeki, Shizuoka-ken (JP)

(73) Assignee: Suzuki Motor Corporation, Shizuoka-ken (JP)

(*) Notice: Subject to any disclaimer, the term of this patent is extended or adjusted under 35 U.S.C. 154(b) by 100 days.

(21) Appl. No.: 09/870,169

(22) Filed: May 30, 2001

(65) Prior Publication Data

US 2001/0052333 A1 Dec. 20, 2001

(30) Foreign Application Priority Data

May 31, 2000 (JP) .................................. 2000-162553

(51) Int. Cl.[7] .............................................. F02F 1/42
(52) U.S. Cl. ................................. 123/193.5; 123/302
(58) Field of Search ................................ 123/302, 308, 123/193.5

(56) References Cited

U.S. PATENT DOCUMENTS 5,167,211 A * 12/1992 Fukuma et al. ............ 123/308
5,894,826 A * 4/1999 Jaye ............................ 123/302
6,367,444 B1 * 4/2002 Yonezawa et al. .......... 123/302

FOREIGN PATENT DOCUMENTS

| JP | 62-103448 | 5/1987 |
| JP | 8-246884 | 9/1996 |
| JP | 9-166025 | 6/1997 |
| JP | 11-324835 | 11/1999 |

* cited by examiner

Primary Examiner—Marguerite McMahon
(74) Attorney, Agent, or Firm—Flynn, Thiel, Boutell & Tanis, P.C.

(57) ABSTRACT

An intake apparatus of a multi-cylinder internal combustion engine wherein intake ports communicating with cylinders located at opposite longitudinal ends of a cylinder head are arranged so as to be inclined in a direction toward the longitudinal center of the cylinder head to reduce the longitudinal length of an installing section of the cylinder head for the intake manifold.

18 Claims, 12 Drawing Sheets

INTAKE SIDE    EXHAUST SIDE

FIG.13

INTAKE SIDE    EXHAUST SIDE

INTAKE APPARATUS OF MULTI-CYLINDER INTERNAL COMBUSTION ENGINE

FIELD OF THE INVENTION

This invention relates to an intake apparatus of a multi-cylinder internal combustion engine, and particularly to an intake apparatus of a multi-cylinder internal combustion engine having two inclined intake ports for every one cylinder in the cylinder head and which reduces the longitudinal length of the cylinder head.

BACKGROUND OF THE INVENTION

In a multi-cylinder internal combustion engine, mounted on a vehicle, that arranges more than one cylinder in series, there is known an intake arrangement wherein two intake ports respectively cooperate with each cylinder and are arranged independently in a cylinder head, and cooperate with an intake manifold.

Figure 15:
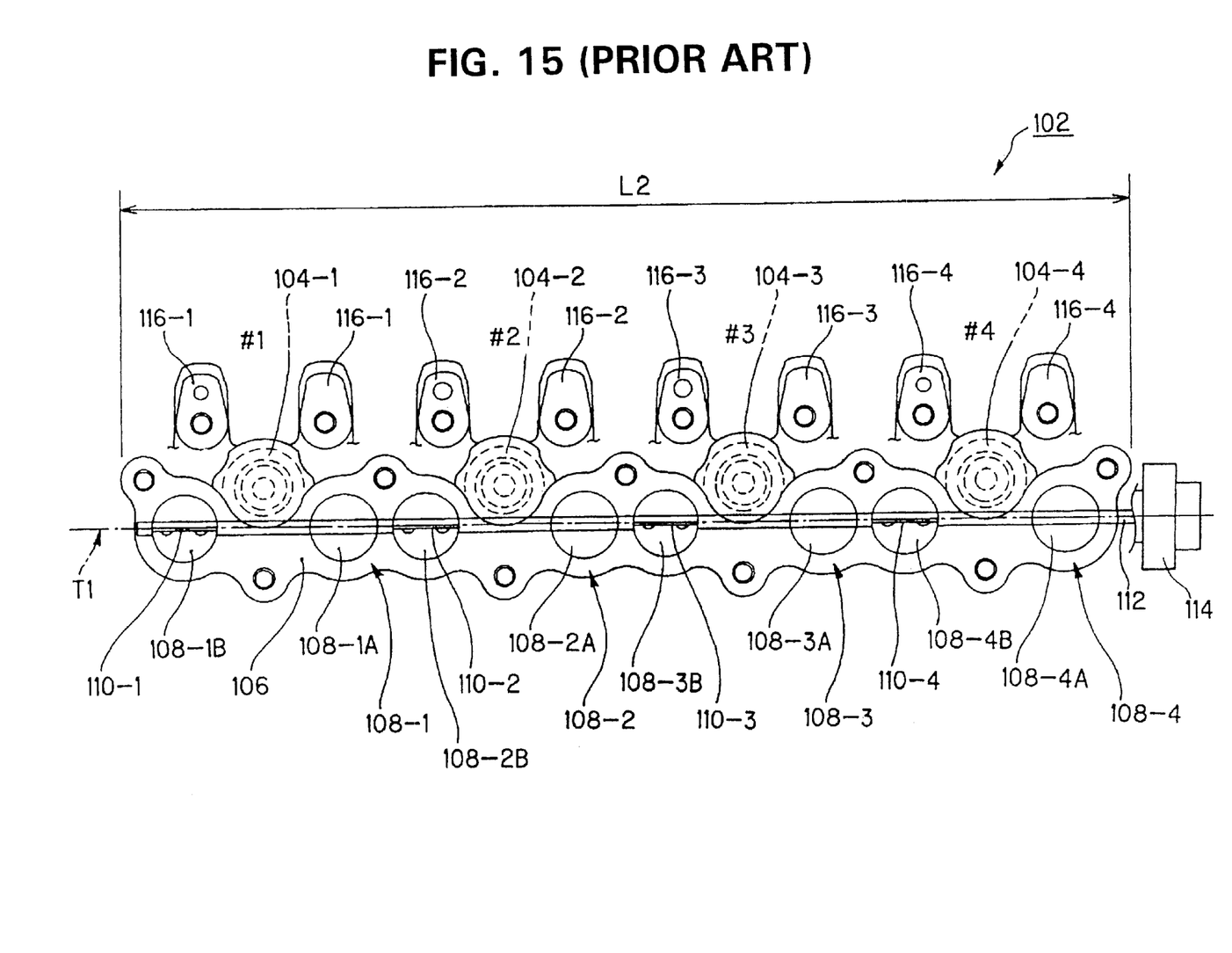
FIG. 15 is a schematic illustration of an intake port and a fuel injector from a traditional cylinder head which is viewed from the top.

For example, as shown in FIG. 15 (prior art), cylinder head 102 is mounted on a cylinder block (not shown) of a multi-cylinder (for example, four cylinders consisting of first cylinder #1, second cylinder #2, third cylinder #3 and fourth cylinder #4) internal combustion engine, first to fourth fuel injectors 104-1 to 104-4 correspond to each cylinder. And, in manifold installing part 106 to which an intake manifold (not shown) is joined through a gasket (not shown), first low speed side port 108-1A and first high speed side port 108-1B functioning as first intake port 108-1 of first cylinder #1 are formed in the longitudinal direction of cylinder head 102 so that first fuel injector 104-1 is located in the center therebetween, and second low speed side port 108-2A and second high speed side port 108-2B as second intake port 108-2 of second cylinder #2 are formed in the longitudinal direction of cylinder head 102 so that second fuel injector 104-2 is located in the center. Similarly, third low speed side port 108-3A and third high speed side port 108-3B as third intake port 108-3 of third cylinder #3 are formed in the longitudinal direction of cylinder head 102 so that third fuel injector 104-3 is located in the center, and fourth low speed side port 108-4A and fourth high speed side port 108-4B as fourth intake port 108-4 of fourth cylinder #4 are formed in the longitudinal direction of cylinder head 102 so that fourth fuel injector 104-4 is located in the center. In addition, the first low speed side port 108-1A, the first high speed side port 108-1B, the second low speed side port 108-2A, the second high speed side port 108-2B, the third low speed side port 108-3A, the third high speed side port 108-3B, the fourth low speed side port 108-4A and the fourth high speed side port 108-4B are arranged on port centerline T1 which extends in the longitudinal direction (i.e., the crankshaft axis direction) of cylinder head 102.

In each first to fourth high speed side port 108-1B to 108-4B, first to fourth swirl control valve 110-1 to 110-4 are arranged, respectively. These first to fourth swirl control valve 110-1 to 110-4 are established with a valve constitution body (not shown) between intake port 108 and the intake manifold, that is, between the manifold installation part 106 of cylinder head 102 and an installation flange of the intake manifold, and is fixed to a valve axle 112 to be located on port centerline T1 and which penetrates each first to fourth low speed side port 108-1A to 108-4A, and is opened and closed by turning this valve axle 112. This valve axle 112 is operated by valve actuator 114.

In cylinder head 102, in order to support a delivery pipe (not shown) to distribute fuel to first to fourth fuel injector 104-1 to 104-4, first delivery pipe installing part 116-1, 116-1 corresponding to first cylinder #1, second delivery pipe installing part 116-2, 116-2 corresponding to second cylinder #2, third delivery pipe installing part 116-3, 116-3 corresponding to third cylinder #3, and fourth delivery pipe installing part 116-4, 116-4 corresponding to fourth cylinder #4 are arranged in a predetermined interval parallel to the longitudinal direction of cylinder head 102.

Examples of such intake apparatus of a multi-cylinder internal combustion engine are disclosed in published Japanese Patent Application Laid-Open Nos. 11-324835, 62-103448, 9-166025, and 8-246884. The intake apparatus of multi-cylinder internal combustion engine disclosed in published Japanese Patent Application Laid-Open No. 11-324835 supports an intake manifold on a cylinder head, and has a rubber gasket between intake manifolds as one set every two cylinders. The intake apparatus of multi-cylinder internal combustion engine disclosed in published Japanese Patent Application Laid-Open No. 62-103448, in the internal combustion engine establishes intake/exhaust valves consisting of three valves every one-cylinder, arranged so that path and hole established corresponding to a cylinder block are located to make a pair and have point symmetry with respect to the center of the cylinder head. The intake apparatus of multi-cylinder internal combustion engine disclosed in published Japanese Patent Application Laid-Open No. 9-166025 in a multi-cylinder internal combustion engine which possesses four valves every one-cylinder, arranges to incline an intake port to either end section of the cylinder head. The intake apparatus of multi-cylinder internal combustion engine disclosed in published Japanese Patent Application Laid-Open No. 8-246884 arranges a valve axle to fix each swirl control valve that arranges to a high-speed side port in an intake port of each cylinder, at the point that takes off from a position of each intake port.

And, in a traditional intake apparatus of a multi-cylinder internal combustion engine, as shown in FIG. 15, because an entrance end of each intake port (in a surface of manifold installing part that becomes an upstream side opening) is formed in the same shape for each cylinder and on the port centerline T1, and the intake port of the longitudinal end section side of the cylinder head extends a greater distance in the longitudinal direction. Accordingly, the prior art manifold installing part of the cylinder head is longer in the longitudinal direction of the cylinder head, resulting in a length L2. As a result, layout of the engine space of the vehicle is inconvenient, and placement of components becomes more difficult because of reduced space.

In addition, in FIG. 15, a valve axle for each swirl control valve is arranged to penetrate each low speed side port without a swirl control valve. Accordingly, there are inconveniences in that ventilation resistance in the low speed side port increases and output performance becomes worse.

To obviate or minimize the above inconvenience, the present invention provides an intake apparatus that comprises an intake port arrangement (e.g. 58-1) for a multi-cylinder internal combustion engine having two intake ports for each cylinder in a cylinder head of the internal combustion engine which has more than one cylinder in series and mounts an intake manifold to said cylinder, wherein said intake port arrangement (e.g. 58-1) has a low speed side port (e.g. 58-1A) and a high speed side port (e.g. 58-1B), and is arranged to incline each intake port located in the longitudinal end sections of the cylinder head as disposed on opposite sides of a transverse center plane.

In this invention, an intake port arrangement of a multi-cylinder internal combustion engine inclines each intake port as located in longitudinal end sections of the cylinder head, toward the transverse centerline of the cylinder head. Accordingly, a longitudinal length of an installing section of the cylinder head, on which an intake manifold is installed, can be shortened. As a result, the degree of freedom of layout of an internal combustion engine in an engine room is increased.

DETAILED DESCRIPTION

Figure 12:
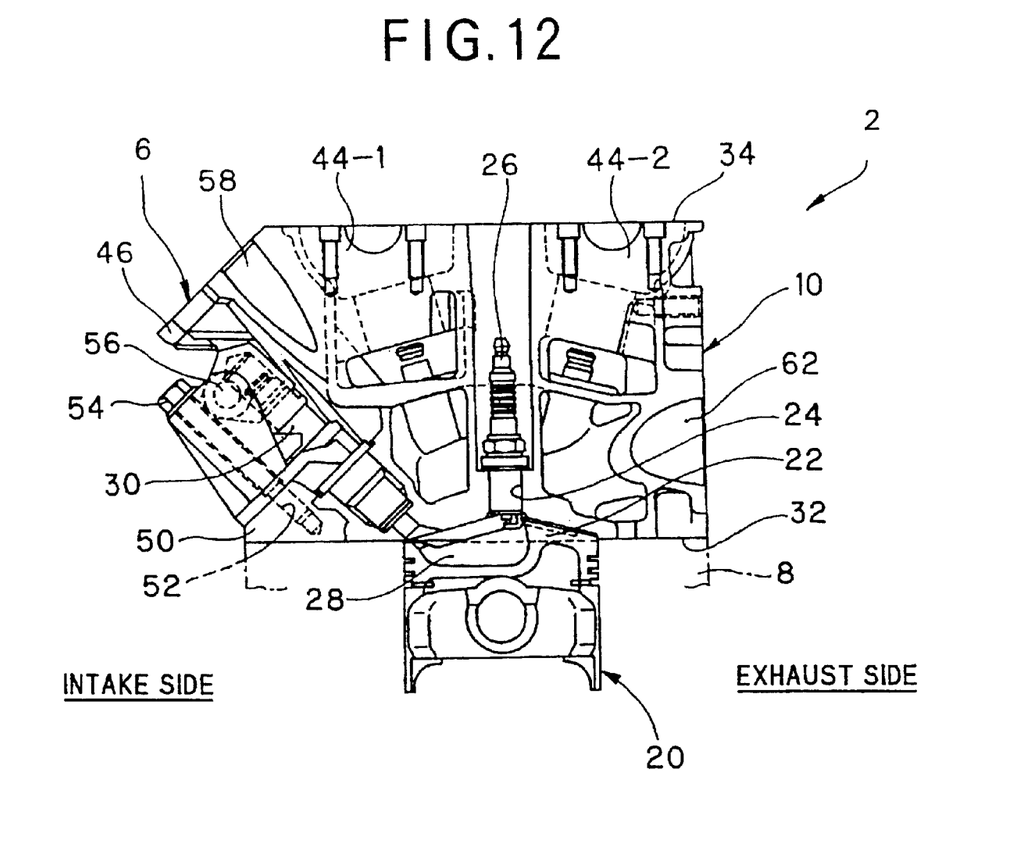
FIG. 12 is a cross-sectional view showing that a piston, a spark plug, a fuel injector and a delivery pipe are installed to the internal combustion engine.
Figure 14:
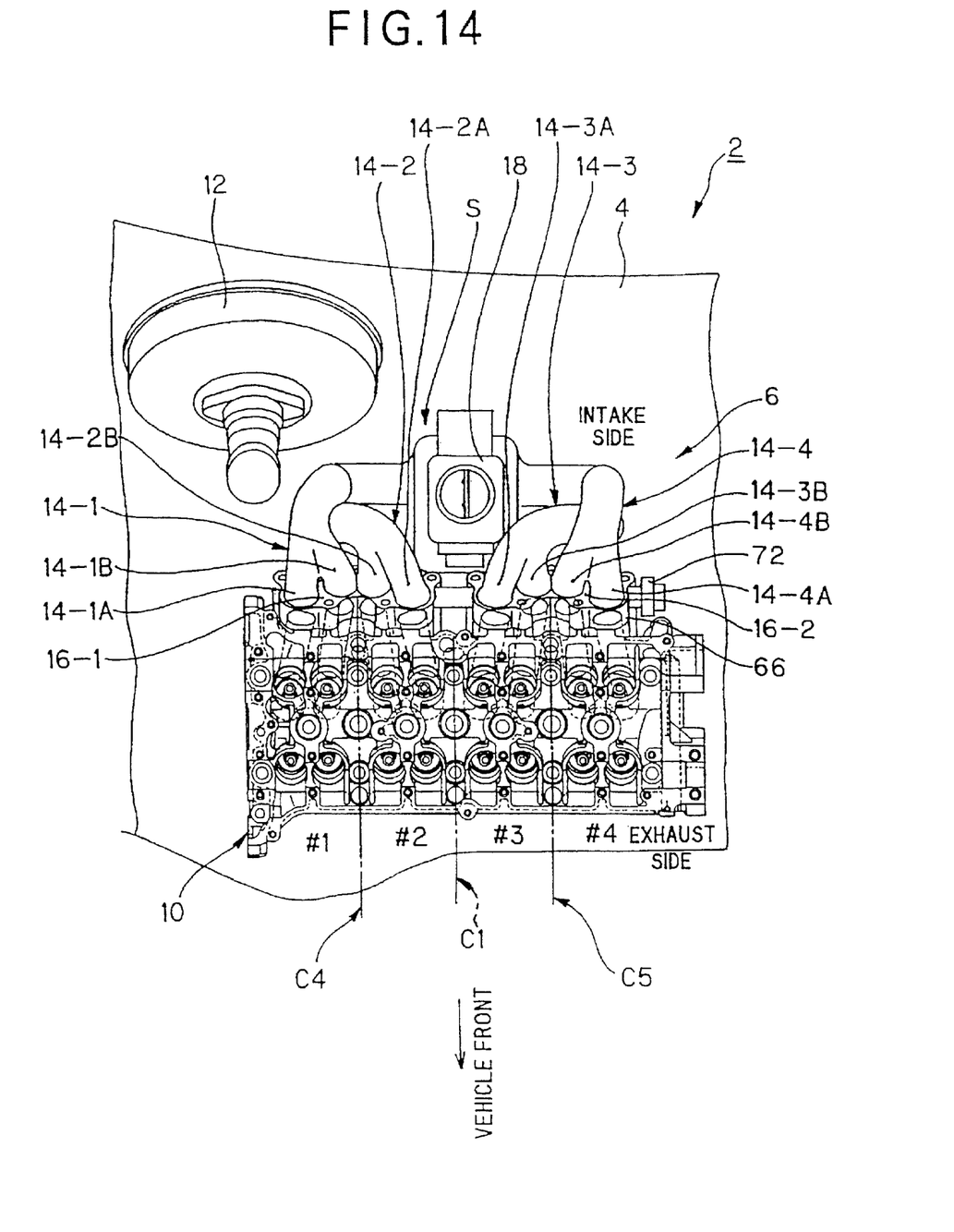
FIG. 14 is a partial plan view of a front part of an engine in a vehicle.

The present invention will now be described in specific detail with reference to FIGS. 1–14 which illustrate an embodiment of this invention. In FIG. 14, reference numeral 2 denotes a vehicle; 4 an engine room of a vehicle 2; 6 a multi-cylinder (for example, four cylinders consisting of #1, #2, #3 and #4 cylinders) internal combustion engine; and 12 a master vacuum device. In FIG. 12, reference numeral 8 is a cylinder block, and 10 a cylinder head having an intake port arrangement that has two intake ports per cylinder.

As shown in FIG. 14, starting at the throttle body 18, flow occurs downstream through the intake manifolds 14-1 to 14-4, then downstream to the low and high speed input ports 58-1A to 58-4A and 58-1B to 58-4B, then downstream through the intake portions of the cylinder head 10 into the combustion chambers 22. In cylinder head 10, at both sides of head centerline or center plane C1 which transversely intersects a longitudinal center part of the cylinder head, a first intake manifold 14-1 corresponding to first cylinder #1 and a second intake manifold 14-2 corresponding to second cylinder #2 are installed by installation flanges 16-1 through a gasket (not shown), and a third intake manifold 14-3 corresponding to third cylinder #3 and a fourth intake manifold 14-4 corresponding to fourth cylinder #4 are installed by installation flanges 16-2 through a gasket (not shown). Each upstream end of the first to fourth intake manifolds 14-1 to 14-4 is connected to throttle body 18 which is located at about the center part of cylinder head 10.

The first-intake manifold 14-1 diverges downstream into the first low speed side pipe 14-1A and the first high speed side pipe 14-1B. The second intake manifold 14-2 diverges downstream into the second low speed side pipe 14-2A and the second high speed side pipe 14-2B. The third intake manifold 14-3 diverges downstream into the third low speed side pipe 14-3A and the third high speed side pipe 14-3B. The fourth intake manifold 14-4 diverges downstream into the fourth low speed side pipe 14-4A and the fourth high speed side pipe 14-4B.

Figure 13:
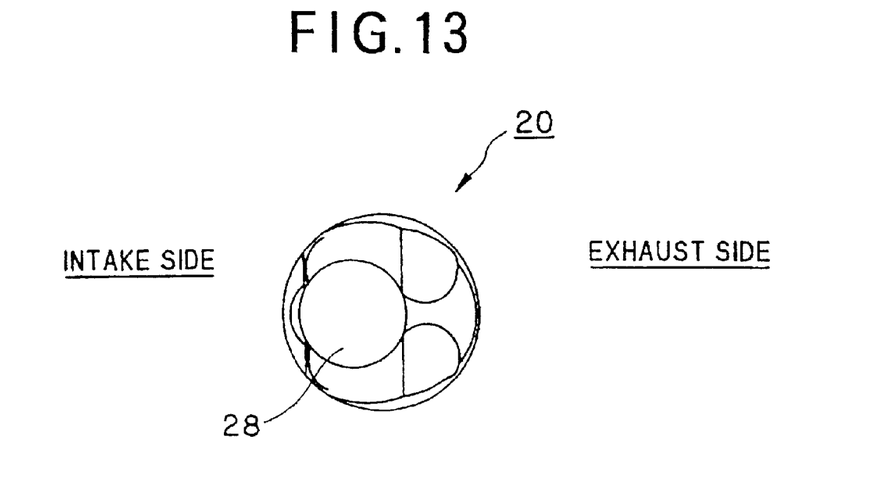
FIG. 13 is a plan view of a piston.

In internal combustion engine 6, as shown in FIG. 12, a piston 20 corresponding to each cylinder is arranged, and in cylinder head 10, combustion chamber 22 corresponding to this piston 20 is formed and spark plug 26 is installed in spark plug hole 24 located in the combustion chamber 22. In an upper surface of piston 20, as shown in FIGS. 12 and 13, hollow part 28 is formed to produce a swirl at the intake side. In addition, a fuel jet valve 30 corresponding to each cylinder is respectively installed in cylinder head 10.

Figure 4:
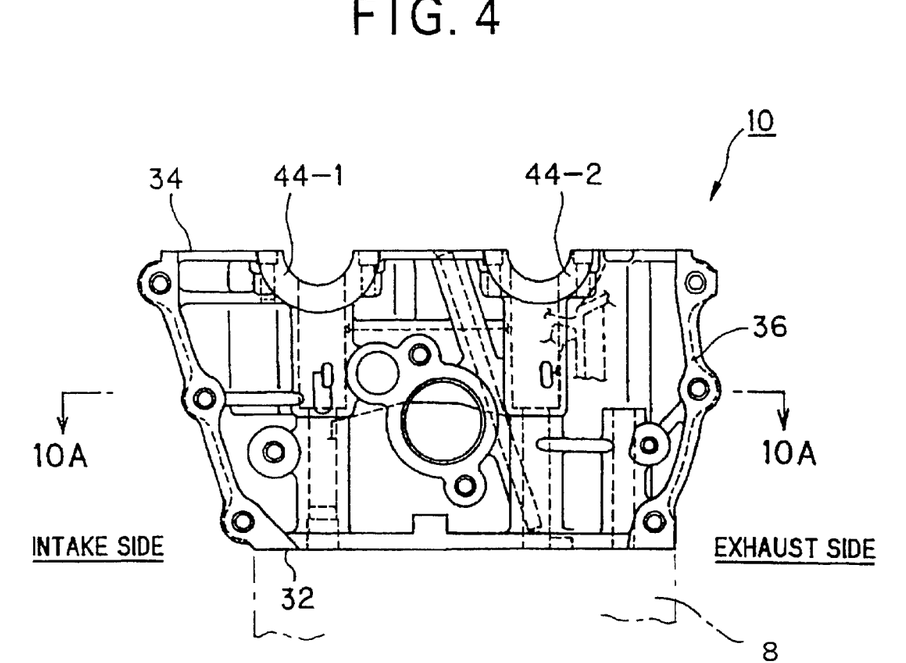
FIG. 4 is a side view from a chain edge section of the cylinder head shown from the direction of arrow 4 in FIG. 1.
Figure 5:
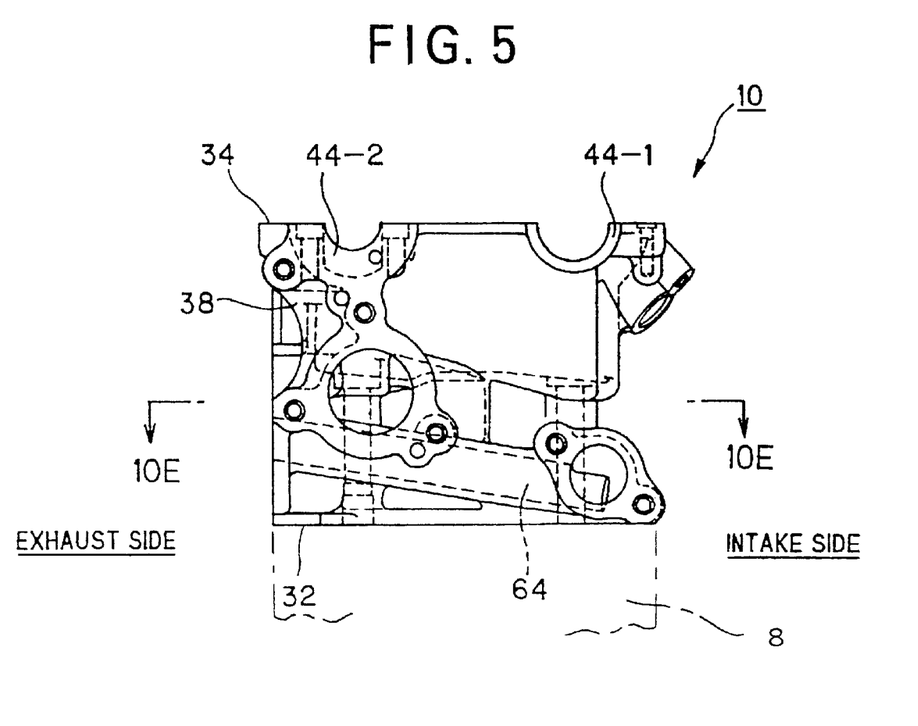
FIG. 5 is a side view from a supplement apparatus installation side end part of the cylinder head shown from the direction of arrow 5 in FIG. 1.

Cylinder head 10, includes a bottom joining surface 32 (FIGS. 2–5) for contact with cylinder block 8, an upper end surface 34 (FIGS. 2–5) to which a cylinder head cover (not shown) is mounted, a chain side end part 36 (FIGS. 4 and 6) at one longitudinal end, a supplement apparatus installation end part 38 (FIG. 5) at the other longitudinal end, a side surface 40 (FIG. 2) along one longitudinal side (i.e. the intake side) of head 10, and a side 42 (FIG. 3) along the other longitudinal side (i.e. the exhaust side) of head 10. As shown in FIGS. 4 and 5, intake side cam bearing part 44-1 and exhaust side cam bearing part 44-2 are formed at predetermined intervals along the upper head surface 34.

Figure 2:
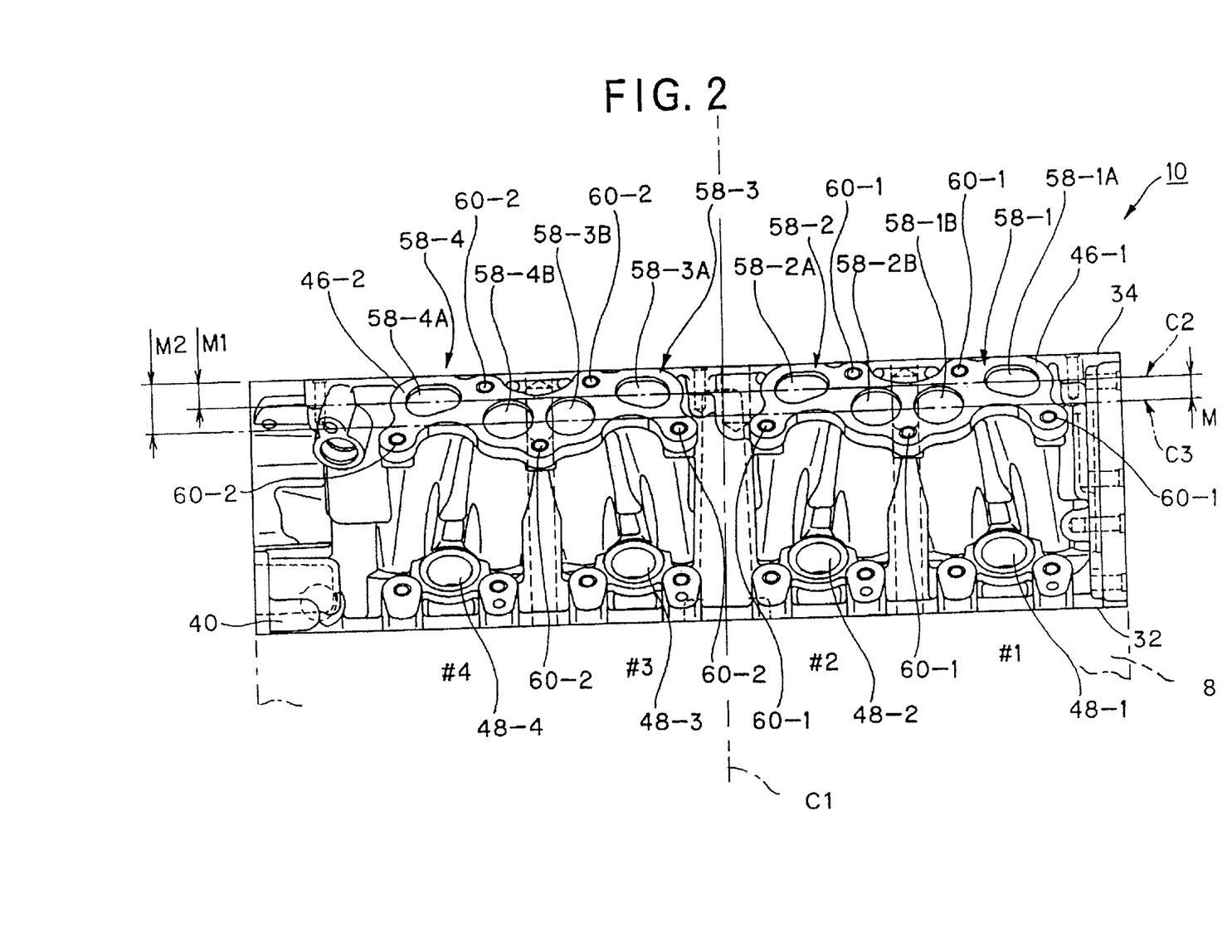
FIG. 2 is an intake side view of the cylinder head taken from the direction of arrow 2 in FIG. 1.
Figure 9:
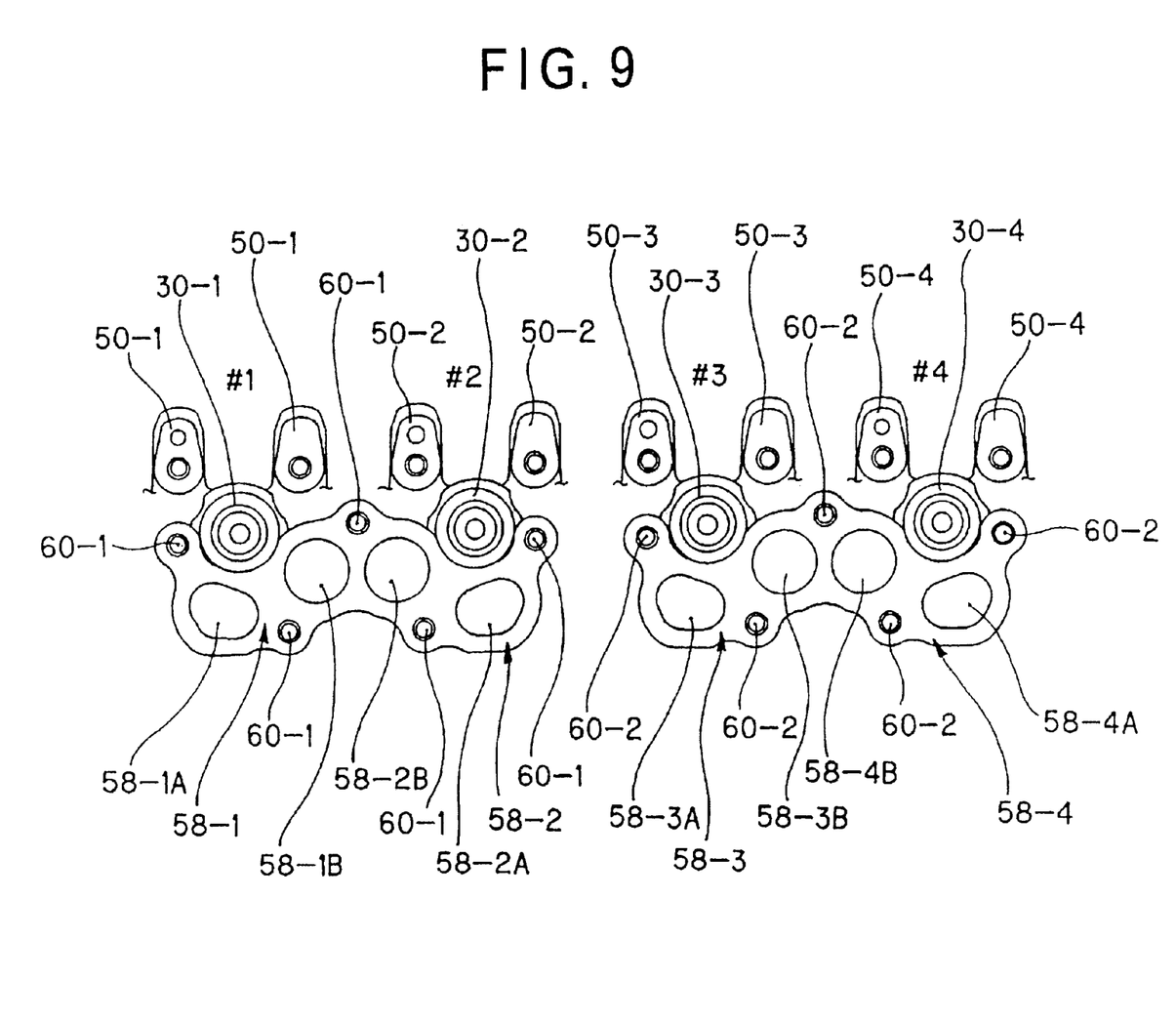
FIG. 9 is an intake side view of the cylinder head taken in the direction of arrow 9 in FIG. 8.
Figure 10:
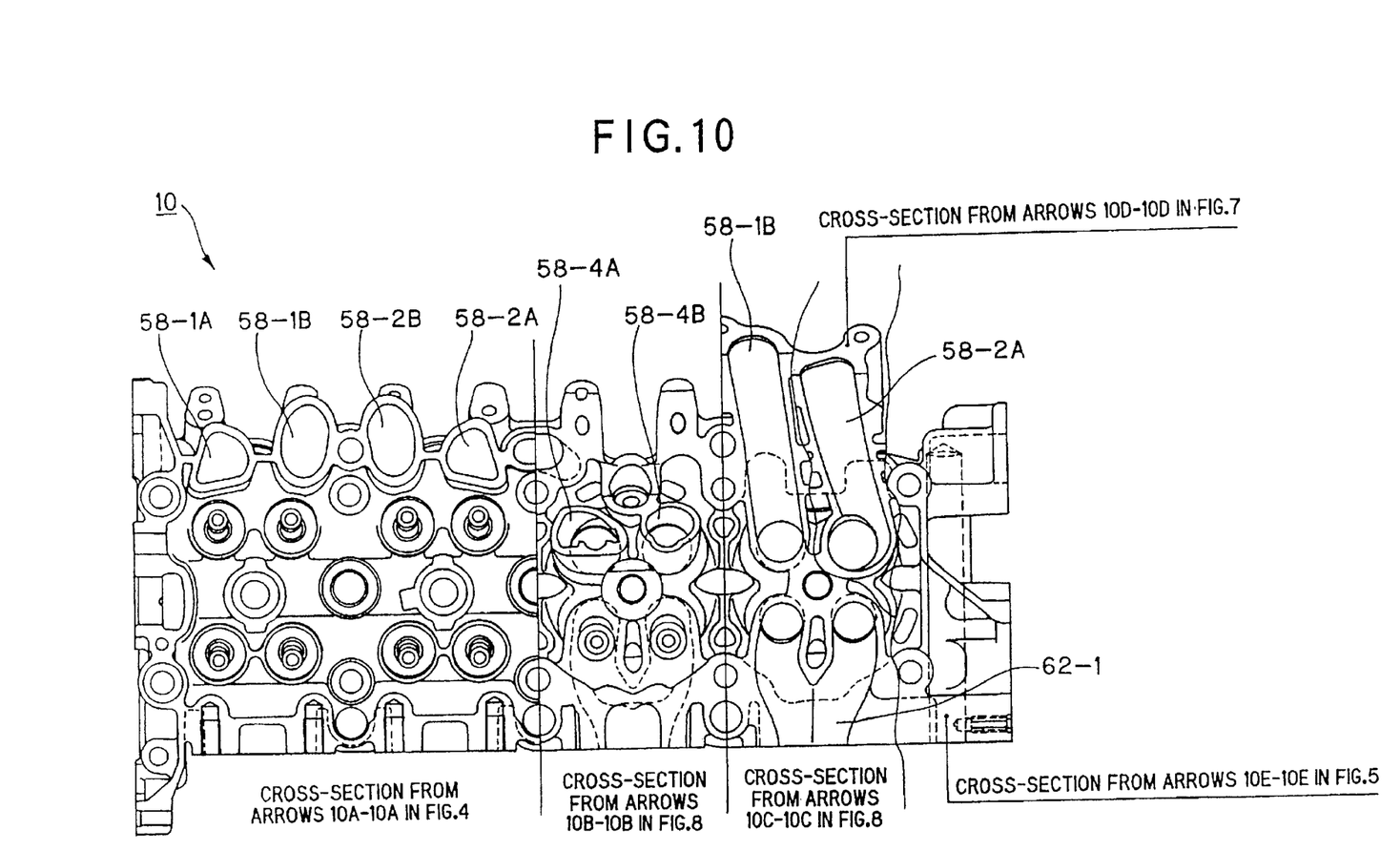
FIG. 10 is a cross-sectional view of a cylinder head showing successively a cross-section along line 10A—10A in FIG. 4, a cross-section along line 10B—10B in FIG. 8, a cross-section along line 10C—10C in FIG. 8, a cross-section along line 10D—10D in FIG. 7, and a cross-section along line 10E—10E in FIG. 5.
Figure 11:
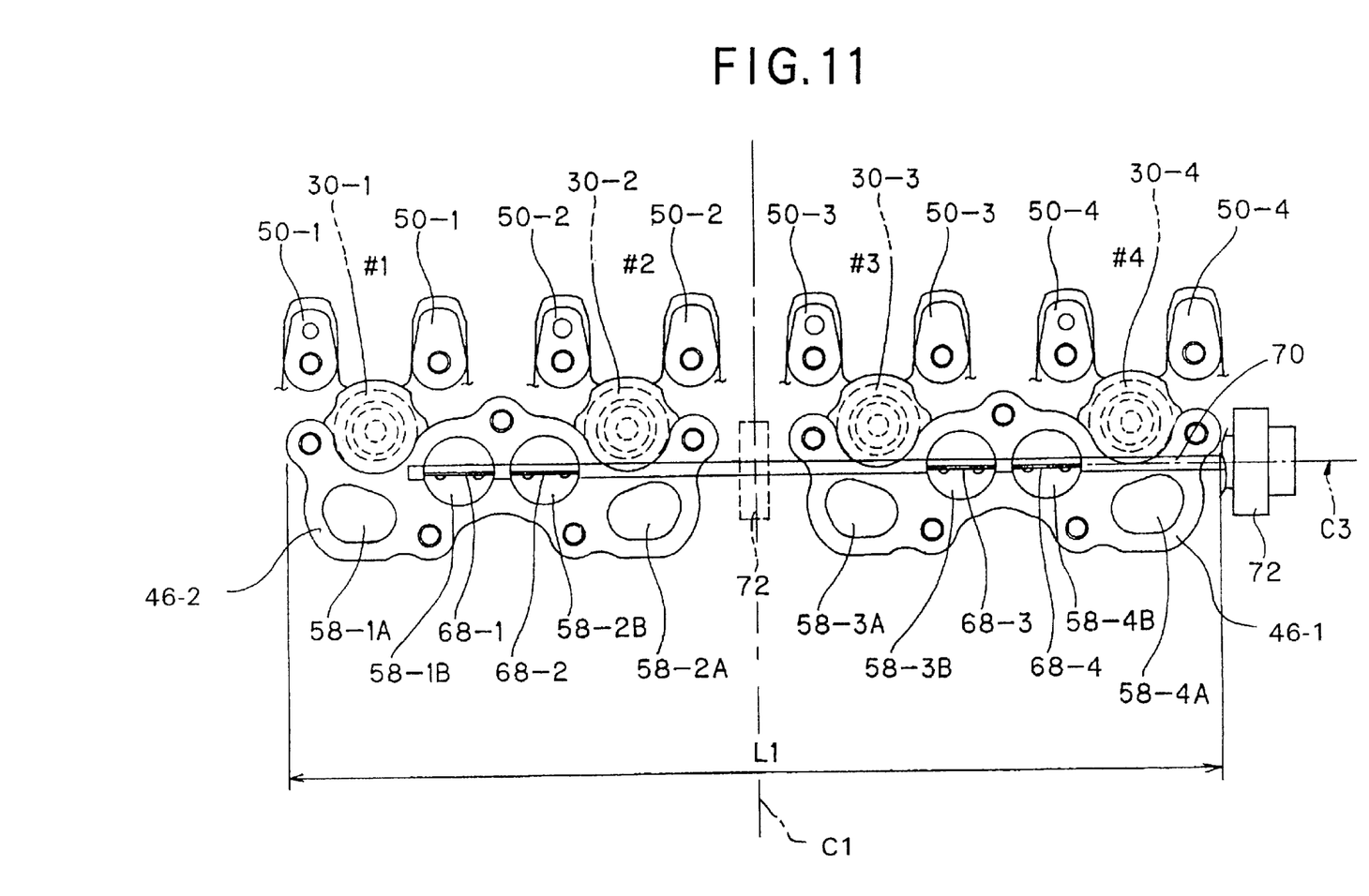
FIG. 11 is a schematic illustration of an intake port and a fuel injector from a cylinder head which is viewed from the top.

Side surface 40 of cylinder head 10, as shown in FIG. 2, is provided symmetrically on opposite sides of head centerline C1 with intake mounting flange 46-1 being the manifold installation part that connects to first intake manifold 14-1 and second intake manifold 14-2, and second injector installing holes 48-1 and 48-2 corresponding to cylinders #1 and #2, all being on one side of centerline C1, and intake mounting flange 46-2 being the manifold installation part that connects to third intake manifold 14-3 and fourth intake manifold 14-4, and second injector installing holes 48-3 and 48-4, all on the other side of centerline C1. In addition, as shown in FIGS. 9 and 11, a pair of first delivery pipe installation parts 50-1 and 50-1 corresponding to first cylinder #1, a pair of second delivery pipe installation parts 50-2 and 50-2 corresponding to second cylinder #2, a pair of third delivery pipe installation parts 50-3 and 50-3 corresponding to third cylinder #3, and a pair of fourth delivery pipe installation parts 50-4 and 50-4 corresponding to fourth cylinder #4, are arranged in a line in predetermined intervals in the longitudinal direction of cylinder head 10. These installation parts 50 are provided to fixedly mount delivery pipe 56 (FIG. 12) and each fuel injector 30 by a fixing bolt 54 that is tightened into a screw hole 52.

In cylinder head 10, as shown in FIG. 2, intake mounting flange 46-1 defines in the upper mounting surface thereof the upstream ends of first intake port 58-1 corresponding to first cylinder #1 and second intake port 58-2 corresponding to second cylinder #2, and intake mounting flange 46-2 similarly defines in the upper mounting surface thereof the upstream ends of third intake port 58-3 corresponding to third cylinder #3 and fourth intake port 58-4 corresponding to fourth cylinder #4.

Figure 1:
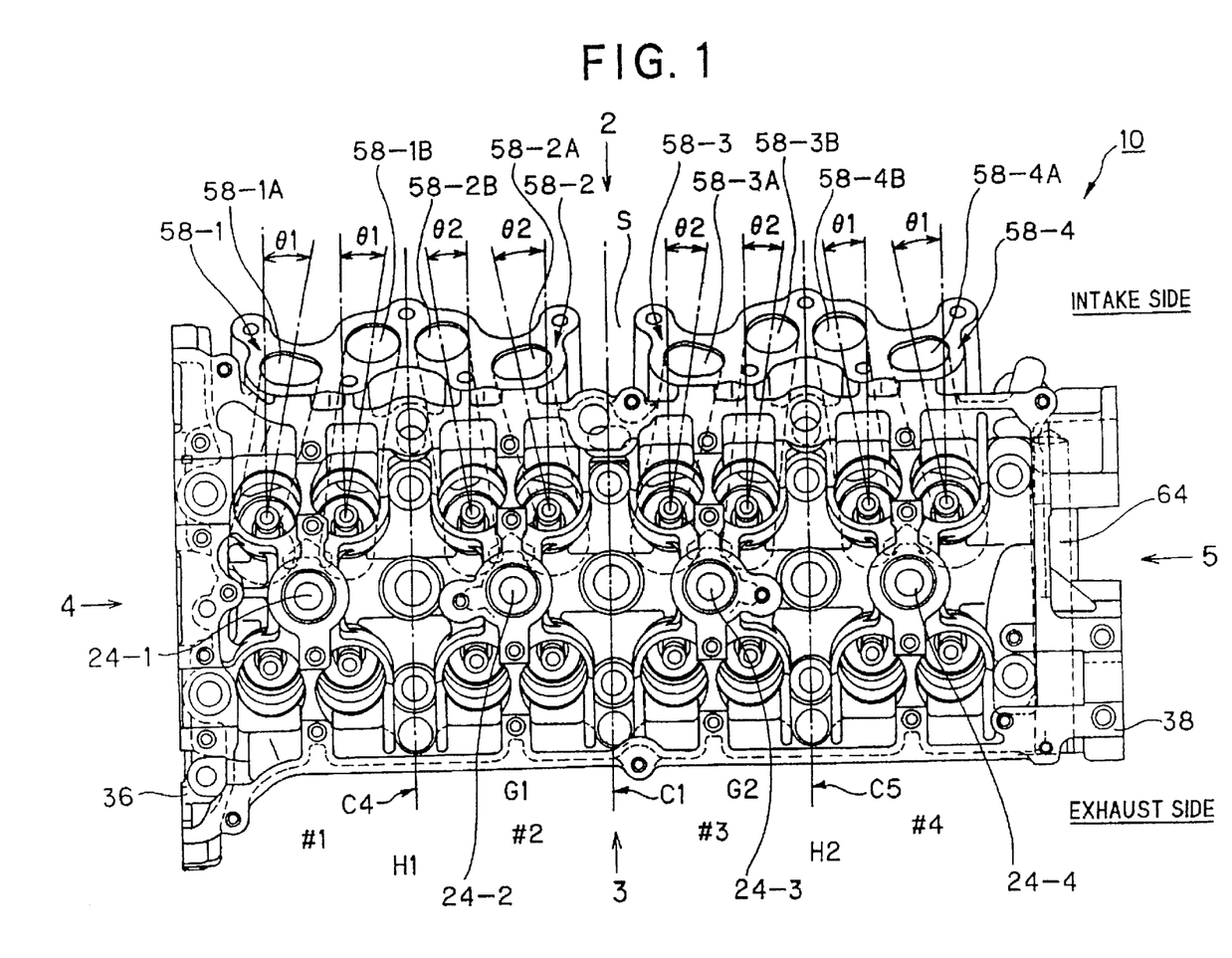
FIG. 1 is a plan view of a cylinder head.
Figure 6:
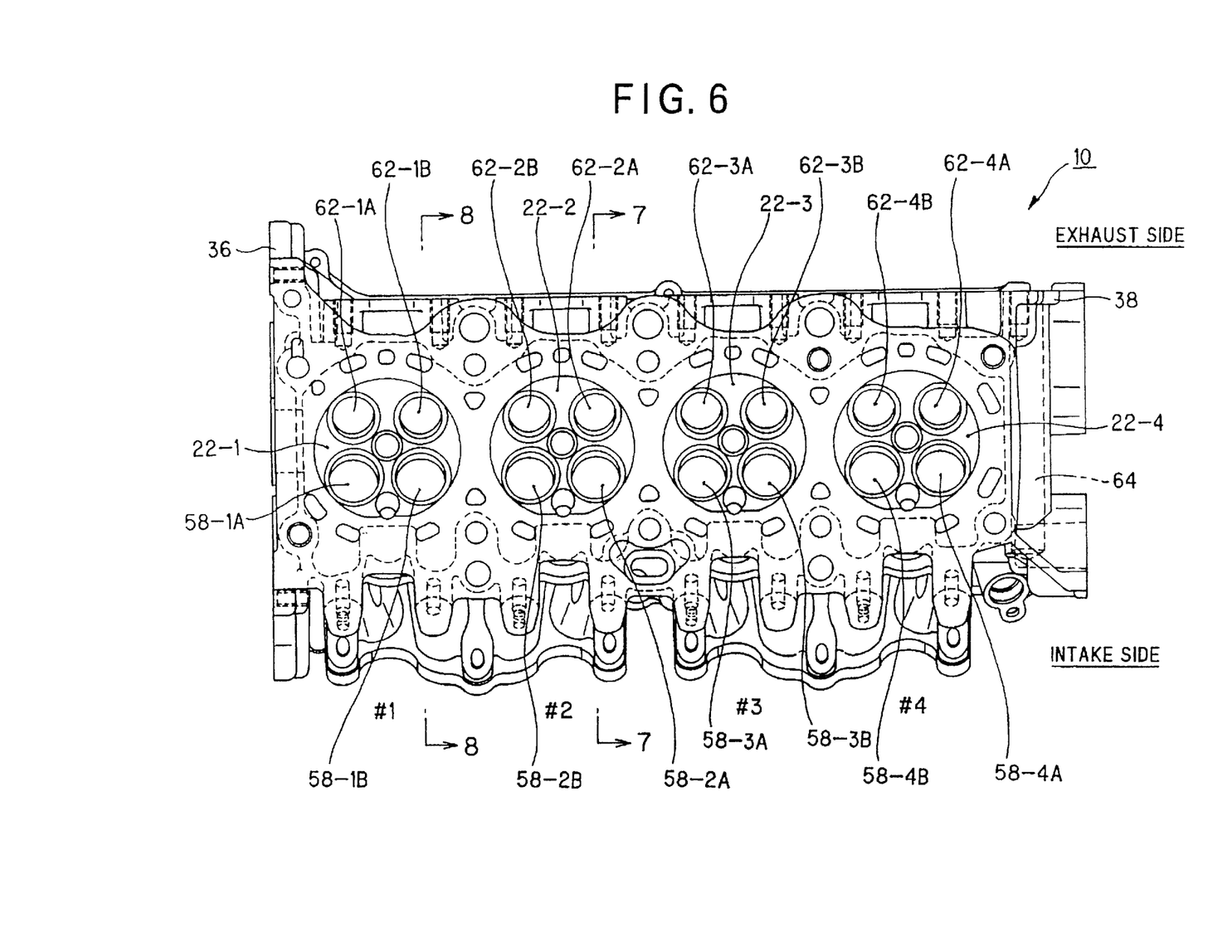
FIG. 6 is a bottom plan view of the cylinder head.
Figure 7:
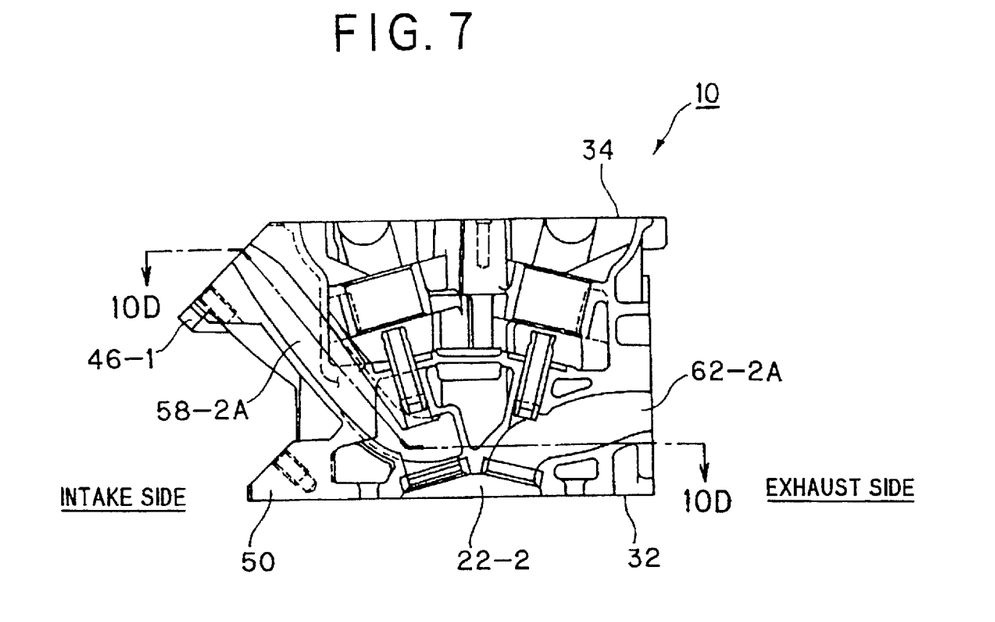
FIG. 7 is a cross-sectional view of the cylinder head taken along line 7—7 in FIG. 6.
Figure 8:
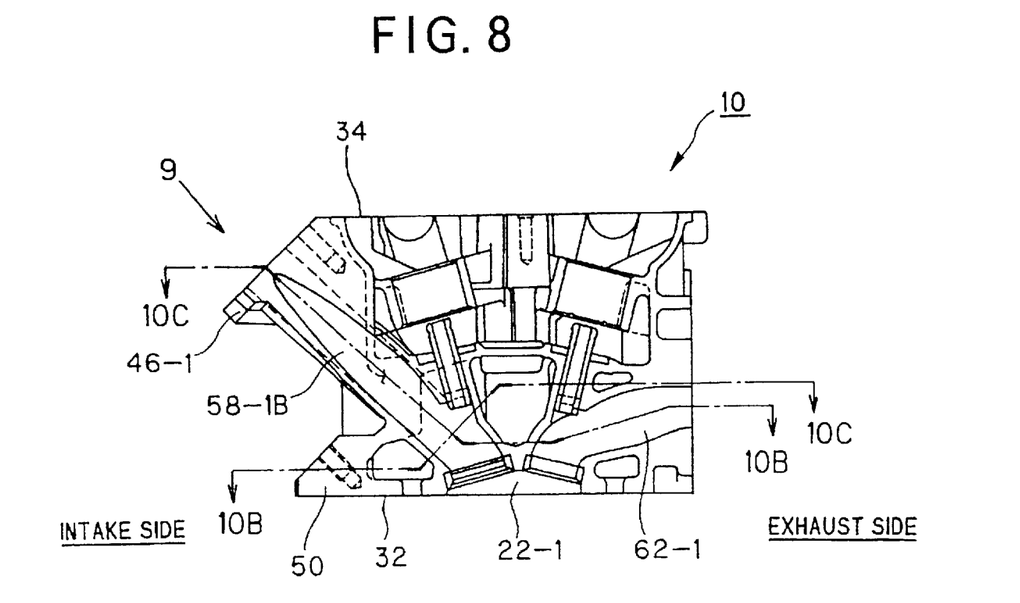
FIG. 8 is a cross-sectional view of a cylinder head taken along line 8—8 in FIG. 6.

AS shown in FIGS. 1 and 6, the first intake port 58-1 consists of a pair of ports, namely a first low speed side port 58-1A and first high speed side port 58-1B, and are in upstream communication with the combustion chamber 22-1. The second intake port 58-2 consists of second low speed side port 58-2A and second high speed side port 58-2B which are in upstream communication with combustion chamber 22-2. The third intake port 58-3 consists of third low speed side port 58-3A and third high speed side port 58-3B which are in upstream communication with combustion chamber 22-3. The fourth intake port 58-4 consists of fourth low speed side port 58-4A and fourth high speed side port 58-4B which are in upstream communication with combustion chamber 22-4. The first to fourth low speed side ports 58-1A to 58-4A, where they connect to the respective combustion chambers, are formed with a conventional helical shape, and as described in U.S. Pat. No. 4,502,432 references 6 and 8, are formed in a shape different from the first to fourth high speed side ports 58-1B to 58-4B which are about a true cylindrical shape. The low speed intake ports, where they intersect the mounting surface on the cylinder head 10, have an elongate or oval configuration, whereas the high speed intake ports have a substantially circular configuration where they intersect the mounting surface.

As shown in FIG. 2, first low speed side port 58-1A, second low speed side port 58-2A, third low speed side port 58-3A and fourth low speed side port 58-4A are arranged along a low speed side port centerline C2 which extends in the longitudinal direction of cylinder head 10. Meanwhile, first high speed side port 58-1B, second high speed side port 58-2B, third high speed side port 58-3B and fourth high speed side port 58-4B are arranged along a high-speed side port centerline C3 that is parallel with but spaced a transverse distance M away from the low speed side port centerline C2. The low speed side port centerline C2 is spaced a transverse distance M1 away from head upper surface 34. The high-speed side port centerline C3 is distance M2 away from head surface 34, and the distance M2 is greater than distance M1.

Referring to FIG. 2, in intake port flange 46-1, bolt inserting holes 60-1 for fixing the intake manifold are formed. In intake port flange 46-2 bolt inserting holes 60-2 for fixing the intake manifold are formed.

Figure 3:
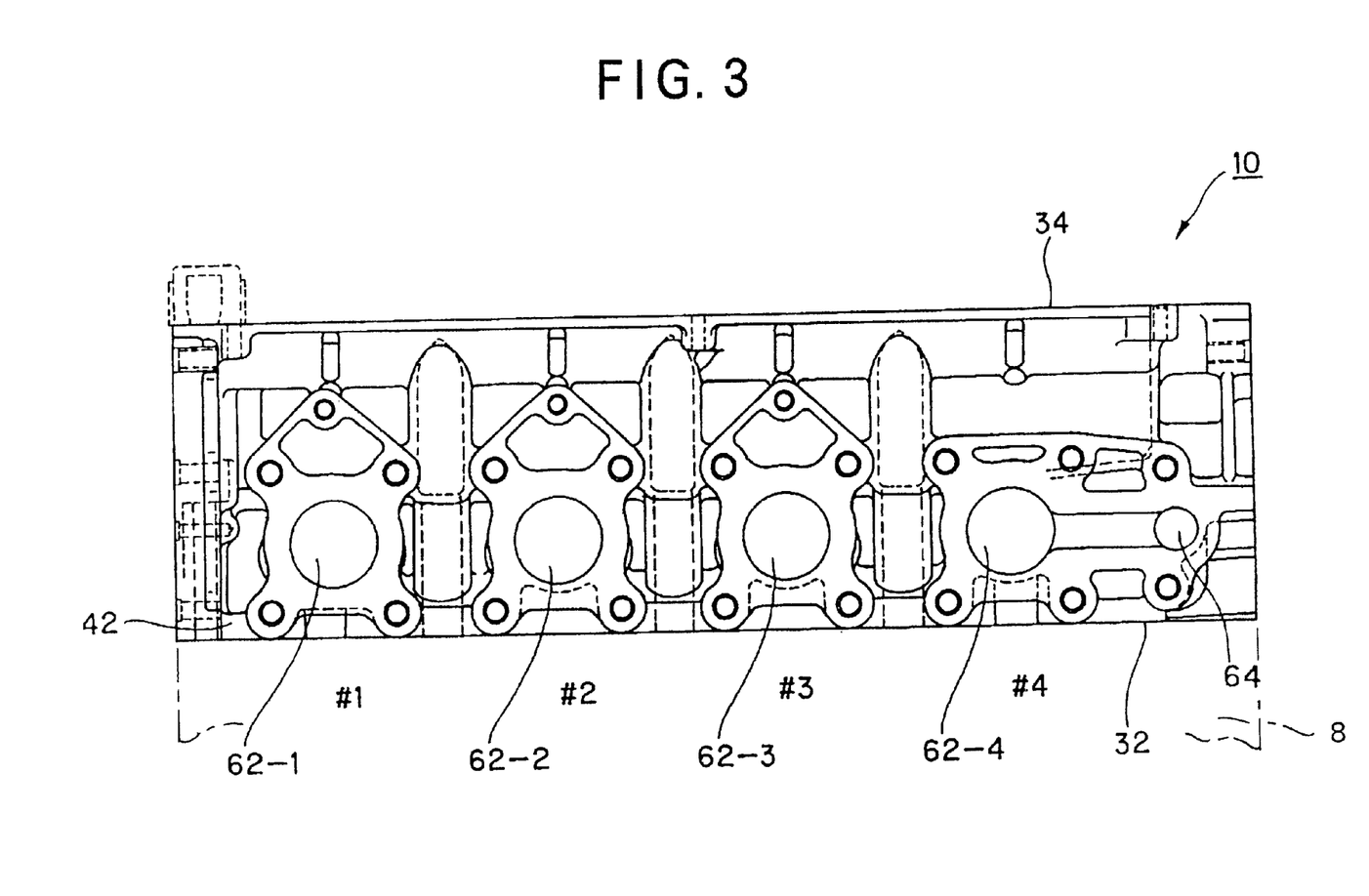
FIG. 3 is an exhaust side view of the cylinder head taken from the direction of arrow 3 in FIG. 1.

Along the other side surface 42 of cylinder head 10, as shown in FIG. 3, first to fourth exhaust ports 62-1 to 62-4 (FIG. 6) that connect to first to fourth combustion chambers 22-1 to 22-4 corresponding to each cylinder are opened. Each exhaust port 62-1 to 62-4 diverges to one and other side ports at the respective combustion chamber 22 side (see FIG. 6). Moreover, EGR path 64 is provided at supplement apparatus installation end part 38.

In this embodiment, as shown in FIG. 2, intake port 58-1 is associated with cylinder #1 which is disposed at one longitudinal end of the cylinder head 10, and intake port 58-4 is associated with cylinder #4 which is disposed at an opposite longitudinal end of the cylinder head 10, and each intake port 58-1 and 58-4 is inclined toward the head centerplane C1. In other words, as shown in FIG. 1, first low speed side port 58-1A and first high speed side port 58-1B of first intake port 58-1 as located adjacent chain end part 36 are arranged so that the outwardly extending centerline that extends upstream through the upstream portion of each port 58-1A and 58-1B, where the port exits at the mounting flange 46-1 is inclined at an angle θ1 relative to head centerplane C1. Likewise, fourth low speed side port 58-4A and fourth high speed side port 58-4B of fourth intake port 58-4 as located adjacent supplement apparatus installation end part 38 are arranged so that the outwardly-extending centerline of the upstream portion of each port 58-4A and 58-4B, where the port exits the mounting flange 46-2, is inclined at an angle θ1 relative to transverse centerplane C1. The angles θ1 for the ports 58-1 and 58-4 are, however, oppositely inclined relative to plane C1, and thus the outwardly-extending centerlines for ports 58-1 and 58-4 converge toward one another and individually converge toward the centerplane C1 as each centerline extends upstream (i.e. outwardly away from the mounting flange). Accordingly, because the first low speed side port 58-1A and the fourth low speed side port 58-4A are located on opposite sides of transverse center plane C1 in the longitudinal direction of cylinder head 10, longitudinal length L1 (FIG. 11) between the longitudinal outer edges of the intake port flanges 46-1 and 46-2 can be shorter than the conventional length L2 shown in FIG. 15.

Internal combustion engine 6 may have more than two cylinders, for example second and third cylinders #2 and #3. These second and third cylinders #2 and #3 that are not located at the longitudinal end sections of cylinder head 10 are divided into two groups G1 and G2 (FIG. 1). In this case, both second low speed side port 58-2A and second high speed side port 58-2B of second cylinder #2 belonging to group G1 are arranged so that the outwardly exiting centerlines of the upstream portions of ports 58-2A and 58-2B, where they exit the mounting flange 46-1, are inclined at an angle θ relative to centerplane C1. Likewise, both third low speed side port 58-3A and third high speed side port 58-3B of third cylinder #3 belonging to group G2 are similarly arranged so that the outwardly exiting centerlines of the upstream portions are inclined at angle θ2 relative to plane C1. The angles θ2 for ports 58-2 and 58-3 are, however, oppositely inclined relative to centerplane C1 and the centerlines for ports 58-2 and 58-3 diverge away from one another and individually diverge away from the centerplane C1. The centerlines for ports 58-2A, 58-2B and 58-3A, 58-3B, as defined by the angles θ2, are separated by the center plane C1 and are inclined toward the respective end sections 36 and 38 of the cylinder head 10 as the centerlines extend upstream. In addition, in a four cylinder engine the centerlines of the two ports on each side of center plane C1, such as adjacent ports 58-1 and 58-2, or adjacent ports 58-3 and 58-4, are oppositely inclined. Accordingly, because the second low speed side port 58-2A and the third low speed side port 58-3A are inclined toward opposite ends away from head centerline C1, a larger space S (FIG. 14) is formed between second intake manifold 14-2 and third intake manifold 14-3, and throttle body 18 can be positioned in this space S.

Each low speed side port 58-1A to 58-4A as it approaches the respective cylinder bore is formed in a conventional manner to create a helical flow to improve swirl ratio in low speed driving and to improve combustible properties.

In one embodiment, the internal combustion engine 6 is a multi-cylinder internal combustion engine of four cylinders arranged in series. For illustrative purposes (see FIG. 1), intake ports 58-1 and 58-2 are placed in group H1, and intake ports 58-3 and 58-4 are placed in group H2 (FIG. 1) which connect two cylinders for each group in sequence from one longitudinal end of the cylinder head 10. In other words, group H1 includes first cylinder #1 and second cylinder #2, and group H2 includes third cylinder #3 and fourth cylinder #4. In group H1, the shape of first intake port 58-1 and second intake port 58-2 are symmetrical about first group center axis line or plane C4 which is transverse to the longitudinal direction of cylinder head 10, and in group H2, the shape of third intake port 58-3 and fourth intake port 58-4 are symmetrical about second group center axis line or plane C5 which is transverse to the longitudinal direction of cylinder head 10. Furthermore, the two groups H1 and H2 are symmetrical about the group center axis line or plane C1 as located between groups H1 and H2.

As shown in FIG. 2 and described above, each low speed side port 58-1A, 58-2A, 58-3A, 58-4A as formed in the respective mounting flange has an elongate or oval shape, whereas each high-speed side port 58-1B, 58-2B, 58-3B, 58-4B as formed in the respective mounting flange has a substantially circular shape. Thus, all of the low speed side ports can have the same shape, all of the high speed side ports can have the same shape, and the high speed and low speed side ports have mutually different shapes. And, distances from head upper surface 34 of cylinder head 10 to about each center of both low speed side and high-speed side ports 58-A and 58-B are are distances M1 and M2, respectively, and are different as described above.

In between intake port 58 and each intake manifold 14, that is, at the interface between each intake mounting flange 46-1 and 46-2 and the opposed manifold installation flange 16-1, 16-2, as shown in FIGS. 11 and 14, a swirl control valve 68-1 to 68-4 is established by a valve body 66. The swirl control valves 68-1 to 68-4 open and close first to fourth high-speed side ports 58-1B to 58-4B respectively. As shown in FIG. 11 the swirl control valves 68-1 to 68-4 corresponding to each cylinder are fixed to a valve axle 70 so as to open and close simultaneously. The valve axle 70 is located on high-speed side port centerline C3. In addition, because low speed side port centerline C2 is distance M away from high-speed side port centerline C3, the valve axle 70 is positioned so that it does not intersect the first to fourth low speed side ports 58-1A to 58-4A. The axle 70 is operated by valve actuator 72.

The operation of the above embodiment will now be briefly described.

Both first and fourth low speed side ports 58-1A and 58-4A, as respectively associated with first and fourth cylinder #1 and #4 as located at longitudinal ends of cylinder head 10, are inclined at angle θ1 relative to center plane C1. Accordingly, length L1 (FIG. 11) between intake port flanges 46-1 and 46-2 as defined at opposite ends of cylinder head 10 can be shorter than conventional length L2 (FIG. 15). As a result, the applicant's internal combustion engine 6 occupies less space than the prior art internal combustion engine.

Moreover, as shown in FIG. 1 remaining second cylinder #2 and third cylinder #3 are divided into two groups G1 and G2. And as the outwardly-extending centerlines of the second intake ports 58-2 of second cylinder #2, belonging to group G1, extend upstream, they are inclined toward first cylinder #1. And as the outwardly-extending centerlines of the third intake ports 58-3 of third cylinder #3, belonging to group G2, extend upstream they are inclined toward fourth cylinder #4. Accordingly, the space S is formed between second intake manifold 14-2 and third intake manifold 14-3, and in space S other parts such as a throttle body 18 can be positioned. Also, the intake system longitudinal distance L1 is less than the longitudinal distance L2 of the prior art. Thus the applicant'invention allows for more space under the hood, or in the engine room 4. This invention can thus contribute to efficient utilization of limited engine room space. Incidentally, when the number of cylinders that are not at the ends of cylinder head 10 is an even number, opened space "S" can still be located in about the central section of the cylinder head 10 in the longitudinal direction. Accordingly, as shown in FIG. 14, when throttle body 18 is established in this space S, the length of an inlet pipe to each cylinder can be equal and reduced, and can improve engine performance.

Further, because the upstream end of low speed side port 58-1A to 58-4A of each cylinder is inclined, each low speed side port 58-A as it extends between the mounting surface and the combustion chamber can be easily formed from a conventional helical shape.

Furthermore, the group H1, which comprises first cylinder #1 and second cylinder #2; and the group H2, which comprises third cylinder #3 and fourth cylinder #4, have linear symmetry between the groups H1 and H2. And the second low and high speed side ports 58-2A and 58-2B are inclined relative to the center plane C1 as are the third low and high speed side ports 58-3A and 58-3B. The two groups G1 and G2 have linear symmetry as well. Therefore, each intake port 58-1 to 58-4 has the same shape, and a gasket used when connecting intake manifolds 14-1 to 14-4 to end face of intake port 58 can be used in common with two groups H1 and H2. Accordingly, because only one kind of gasket need be used, the number of different parts can be reduced. Moreover, because a gasket is divided every two cylinders, miniaturization of the gasket can be achieved.

The elongate or oval shape of the low speed side ports, 58-1A to 58-4A is different from the substantially circular shape of the high speed side ports 58-1B to 58-4B. The low speed side port centerline C2 is spaced from the head upper end surface 34 at distance M1. The high speed side port centerline C3 is spaced from the head upper end surface 34 at distance M2, which is different from M1. Accordingly, an integrating mistake when a gasket is positioned on the mounting flange can be prevented, and an unskilled person can easily mount a gasket, as a result, productivity can be improved.

Further, in low speed side ports 58-1A to 58-4A, because valve axle 70 of swirl control valve 68 does not penetrate, ventilation resistance in low speed side port 58-A does not increase, and output performance can be improved.

Conventionally in a multi-cylinder internal combustion engine, a cylinder head has two separated intake ports, and the one intake port of each cylinder is a helical flow port that is formed at least partially in a helical shape, and the direction of the helical port of each cylinder is different. In addition, the piston shape has non-symmetry with respect to the center of the cylinder bore, and the direction of the piston must be changed according to the letting direction of the helical port fit. Accordingly, pistons of two kinds of shape become necessary. However, in this invention, as shown in FIGS. 12 and 13, because piston 20 can have symmetric shape with respect to a center of the cylinder bore, the piston 20 in all cylinders can be the same shape. Accordingly, an integrating mistake of the piston 20 is prevented, and different kinds of parts can be reduced.

Incidentally, in this invention, valve actuator 72 can be coaxial with the high speed side port centerline C3, and intersect head centerline C1 (shown with a dashed line of FIG. 11), and valve axle 70 is arranged to be symmetric with respect to this valve actuator 72 in both sides of cylinder head 10, and space of end sections of cylinder head 10 is utilized effectively, and weight balance can be planned because of being symmetric, and can prevent vibration from occurring.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An intake apparatus of a multi-cylinder internal combustion engine having a cylinder head provided with at least three cylinders disposed in series, first and second said cylinders being disposed at opposite ends of said series and located adjacent opposite longitudinal ends of said cylinder head, said cylinder head having a mounting surface thereon which cooperates with intake manifolds for communication with said cylinders, said intake apparatus including two intake ports formed in said mounting surface and communicating with each respective said cylinder, the two intake ports communicating with said first cylinder having centerlines which as they project outwardly from the mounting surface are inclined so as to converge toward a center plane, which is disposed substantially longitudinally midway between the first and second cylinders and which substantially perpendicularly intersects a longitudinal direction of the cylinder head, and said intake ports associated with said second cylinder being defined by centerlines which as they project outwardly from said mounting surface are inclined so as to converge toward said center plane.

2. An intake apparatus according to claim 1, wherein said cylinder head includes third and fourth cylinders which are disposed between said first and second cylinders, said third and fourth cylinders being respectively positioned adjacent said first and second cylinders and positioned longitudinally on opposite sides of said center plane, each of said third and fourth cylinders having two intake ports respectively associated therewith and formed in said mounting surface, the intake ports associated with each of said third and fourth cylinders being defined by centerlines which as they project outwardly from said mounting surface are inclined so as to diverge away from said center plane.

3. An intake apparatus according to claim 2, wherein said mounting surface includes first and second flat surface areas defined on opposite sides of said center plane, said first flat surface area having the intake ports associated therewith as corresponding to said first and third cylinders, and said second flat surface area having the intake ports associated therewith which correspond to said second and fourth cylinders.

4. An intake arrangement according to claim 3, wherein a first said intake port as associated with each said cylinder has a generally circular configuration at said mounting surface, and wherein a second said intake port as associated with each said cylinder has an oval configuration at said mounting surface.

5. An intake arrangement according to claim 3, wherein the first intake ports associated with said plurality of cylinders are disposed with centers thereof located on a first centerline which extends generally parallel with the longitudinal direction, and the plurality of second intake ports associated with said cylinders are disposed with centers thereof located on a second centerline which is generally parallel with and spaced transversely from said first centerline.

6. An intake apparatus according to claim 5, wherein the first intake ports associated with the adjacent first and third cylinders, and the first intake ports as associated with the adjacent second and fourth cylinders, are positioned closely adjacent one another in the longitudinal direction and are positioned longitudinally between the second intake ports associated with the pair of adjacent first and third cylinders and as associated with the pair of adjacent second and fourth cylinders.

7. An intake arrangement according to claim 1, wherein a first said intake port as associated with each said first and second cylinder has a generally circular configuration at said mounting surface, and wherein a second said intake port as associated with each said first and second cylinder has an oval configuration at said mounting surface, and the arrangement at said mounting surface of the first and second intake ports of said first and second cylinders being generally symmetrical relative to said center plane.

8. An intake arrangement according to claim 7, wherein the first intake ports associated with said plurality of cylinders are disposed with centers thereof located on a first centerline which extends generally parallel with the longitudinal direction, and the plurality of second intake ports associated with said cylinders are disposed with centers thereof located on a second centerline which is generally parallel with and spaced transversely from said first centerline.

9. An intake apparatus as defined in claim 1, wherein the two intake ports communicating with the first cylinder include a low speed intake port adjacent a first longitudinal end of the cylinder head and a high speed intake port disposed between said first cylinder low speed port and the centerline plane, and wherein the two intake ports communicating with the second cylinder include a low speed intake port adjacent a second longitudinal end of the cylinder head and a high speed intake port disposed between said second cylinder low speed port and the centerline plane.

10. An engine as defined in claim 9, wherein said internal combustion engine has four cylinders arranged in series, and said intake port consists of two groups which connect two cylinders for each group in sequence from one longitudinal end of said cylinder head, and in each group the shape of each said intake port has symmetry with respect to a group center axis which is perpendicular to the longitudinal direction of the cylinder head, and said two groups have symmetry with respect to a group center axis which is between said two groups and is perpendicular to the longitudinal direction of said cylinder head.

11. An engine as defined in claim 9, wherein said two intake ports are formed of mutually different shapes, and in the intake port opening end surface, distances from an upper surface of said cylinder head to each center of said two intake ports are set to be different, respectively.

12. An engine as defined in claim 9, wherein in between said intake port flange arrangement and said intake manifold, swirl control valves to open and close said high speed intake ports are established, each of said swirl control valves is fixed to a common valve axle so as to open and close simultaneously, and the valve axle is arranged so as to not intersect said low speed intake ports.

13. A multi-cylinder internal combustion engine having a cylinder head and cylinder block defining plural parallel cylinders disposed serially in sidewardly spaced relation along the longitudinal direction of the cylinder head, and an intake apparatus for communication with said cylinders, said intake apparatus including two intake ports formed in said cylinder head and associated respectively with each said cylinder, the cylinder head having an intake port flange arrangement for attachment to an intake manifold, the two intake ports associated with each said cylinder having downstream ends thereof connected to the combustion chamber associated with the respective cylinder and having upstream ends thereof which terminate in intake openings defined in the intake port flange arrangement for communication with the intake manifold, wherein first and second said cylinders as located adjacent opposite ends of said series are located adjacent opposite longitudinal end sections of the cylinder head and are disposed on opposite sides of a centerline plane which extends transverse to the longitudinal direction of the cylinder head and is disposed substantially midway between the first and second cylinders, and the upstream ends of said two intake ports as associated with said first and second cylinders as the intake ports open outwardly through the intake port flange arrangement are inclined toward the transverse centerline plane so as to minimize the length of the intake port flange arrangement as it extends longitudinally of the cylinder head.

14. An internal combustion engine according to claim 13, wherein the plurality of cylinders includes third and fourth cylinders which are positioned in series between said first and second cylinders, said third and fourth cylinders being positioned respectively adjacent said first and second cylinders and on opposite sides of the transverse centerline plane, the two intake ports associated with said third cylinder where they open outwardly through the intake port flange arrangement being inclined toward the longitudinal end of the cylinder head having said first cylinder associated therewith, the two intake ports associated with said fourth cylinder where they open outwardly through the intake port flange arrangement being inclined longitudinally toward said fourth cylinder as located adjacent the other longitudinal end of the cylinder head, whereby the intake ports associated with said third and fourth cylinders due to their outward inclination toward opposite longitudinal ends of the cylinder head effectively diverge away from the transverse centerline plane.

15. A combustion engine according to claim 13, wherein said two intake ports as associated with each said cylinder include a low-speed side port and a high-speed side port.

16. An engine according to claim 13, wherein the two intake openings defined by the two intake ports associated with each of said first and second cylinders are of different shapes and are positioned in longitudinally spaced relationship to one another.

17. An engine according to claim 16, wherein one of the intake openings has a longitudinally elongated shape, wherein the other intake opening is of a more round shape, and wherein the longitudinally elongated intake opening is positioned longitudinally a greater distance from the transverse centerline plane than said other intake opening.

18. An intake apparatus of a multi-cylinder internal combustion engine having a cylinder head provided with a plurality of intake port arrangements, said cylinder head having a mounting surface thereon which cooperates with the intake manifolds for communication with said cylinders, each said intake port arrangement having a pair of intake ports formed in said surface, each pair of intake ports respectively communicating with a respective one of said cylinders, each pair of intake ports having a low speed port and a high speed port, wherein the cylinder closest to each longitudinal end of the cylinder head has a low speed port disposed closer to the longitudinal end than the respective high speed port, and another said cylinder disposed closest to the center plane has its respective low speed port disposed closer to the center plane than its respective high speed port, and said intake ports having centerlines which as they project upstream and outwardly from said mounting surface are inclined so that the intake port arrangements closest to the longitudinal ends are inclined longitudinally toward the center plane and the intake port arrangements closest to the center plane are inclined longitudinally away from the center plane.

* * * * *